United States Patent [19]

Davidson et al.

[11] Patent Number: 4,758,253

[45] Date of Patent: Jul. 19, 1988

[54] ADSORPTION PROCESS

[75] Inventors: Peter J. Davidson, Darlington; Warwick J. Lywood, Hutton Rudby, both of England

[73] Assignee: Imperial Chemical Industries PLC, London, England

[21] Appl. No.: 60,445

[22] Filed: Jun. 11, 1987

Related U.S. Application Data

[63] Continuation-in-part of Ser. No. 924,037, Oct. 28, 1986, Pat. No. 4,729,982.

[30] Foreign Application Priority Data

| Feb. 24, 1986 [GB] | United Kingdom | 8704243 |
| Jun. 12, 1986 [GB] | United Kingdom | 8614297 |
| Oct. 24, 1986 [EP] | European Pat. Off. | 86308277.2 |

[51] Int. Cl.$^4$ .................... B01D 53/06; B01D 53/04
[52] U.S. Cl. .................................. 55/77; 55/74; 55/75; 502/400
[58] Field of Search ............... 55/31, 33–35, 55/60–62, 74–79, 99, 179–181, 387–390; 502/400, 527

[56] References Cited

U.S. PATENT DOCUMENTS

| Re. 21,004 | 2/1939 | Kopp | 55/34 X |
|---|---|---|---|
| 2,328,974 | 9/1943 | Guler | 55/34 X |
| 2,408,164 | 9/1946 | Foster | 502/226 |
| 2,859,257 | 11/1958 | Hess et al. | 55/75 X |
| 3,176,446 | 4/1965 | Siggelin | 55/34 X |
| 3,292,346 | 12/1966 | Adams | 55/180 |
| 3,490,201 | 1/1970 | Colvin et al. | 55/60 X |
| 3,825,460 | 7/1974 | Yoshikawa et al. | 502/527 X |
| 3,919,369 | 11/1975 | Holden | 264/45.1 |
| 4,012,206 | 3/1977 | Macriss et al. | 55/34 |
| 4,134,743 | 1/1979 | Macriss et al. | 55/34 |
| 4,214,011 | 7/1980 | Strube | 55/75 X |
| 4,259,299 | 3/1981 | Hagiwara et al. | 55/75 X |
| 4,391,616 | 7/1983 | Imamura | 55/34 X |
| 4,409,006 | 10/1983 | Mattia | 55/28 |
| 4,448,833 | 5/1984 | Yamaguchi et al. | 502/527 X |
| 4,452,612 | 6/1984 | Mattia | 55/25 |
| 4,455,336 | 6/1984 | Ogawa et al. | 502/527 X |
| 4,510,261 | 4/1985 | Pereira et al. | 502/527 X |
| 4,510,262 | 4/1985 | Kim et al. | 502/527 X |
| 4,510,263 | 4/1985 | Pereira et al. | 502/527 X |
| 4,518,704 | 5/1985 | Okabayashi et al. | 55/74 X |
| 4,594,860 | 6/1986 | Coellner et al. | 55/390 X |
| 4,656,157 | 4/1987 | Hofmann et al. | 502/527 X |
| 4,661,133 | 4/1987 | Lavie | 55/77 X |
| 4,674,563 | 6/1987 | Maier-Laxhuber et al. | 165/104.12 |

FOREIGN PATENT DOCUMENTS

| 0043996 | 1/1982 | European Pat. Off. | |
| 0134138 | 3/1985 | European Pat. Off. | |
| 0183358 | 6/1986 | European Pat. Off. | |
| 0223445 | 5/1987 | European Pat. Off. | |
| 2414663 | 11/1974 | Fed. Rep. of Germany | 55/390 |
| 2425058 | 12/1975 | Fed. Rep. of Germany | 502/527 |
| 2604032 | 8/1977 | Fed. Rep. of Germany | 55/390 |
| 0151786 | 6/1986 | Fed. Rep. of Germany | |
| 137031 | 10/1980 | Japan | 502/527 |
| 2155805 | 10/1985 | United Kingdom | |

OTHER PUBLICATIONS

Chemical Engineering Science, 40, 11:2019–2025 (1985).

*Primary Examiner*—Robert Spitzer
*Attorney, Agent, or Firm*—Cushman, Darby & Cushman

[57] ABSTRACT

A heat and mass exchange, pressure and/or thermal swing adsorption process using an adsorbent bed which consists of at least one unit having substantially parallel passages through it. Each unit has at least 20 passages per $cm^2$ of its cross-sectional area, the number and cross-sectional area of the passages being such that each unit has a geometric void of not more than 0.45. The bed may be random packed or a close packed assembly or stack of units.

10 Claims, No Drawings

ADSORPTION PROCESS

This application is a continuation-in-part of copending application Ser. No. 924,037 filed Oct. 28, 1986 entitled "Bed Packing Material", now U.S. Pat. No. 4,729,982.

This invention relates to an adsorption process, and in particular to adsorption processes of the heat and mass exchange (HME), pressure swing (PSA) or thermal swing (TSA) type. Such processes are employed for a variety of applications where it is desired to separate a gaseous mixture into a first stream that is enriched relative to the feed mixture in respect of one or more component gases of the mixture and a second stream that is enriched relative to the feed mixture in respect of one or more other component gases of the mixture.

A HME process is described in Chemical Engineering Science 40 (1985) No 11 pages 2019 to 2025.

Processes of the PSA or TSA type are normally operated on a cyclic basis using a plurality of beds of an adsorbent material: the cycle involves the basic steps of (a) passing the feed gas, at a first pressure, through the adsorbent bed: the more readily adsorbed component, or components, of the feed gas are adsorbed on the adsorbent while the less readily adsorbed component, or components, pass through the bed to give a first product stream at a pressure that is only lower than the pressure of the feed gas by the pressure drop provided by the resistance to flow of gas through the bed;

(b) desorbing the adsorbed gas from the bed by reducing the pressure and/or by increasing the temperature, e.g. by the passage of a heated regeneration gas therethrough: the desorbed gas thus gives a second product stream comprising the more readily adsorbed component, or components, of the feed gas; and (c) returning the adsorbent bed to the adsorption step (a).

Alternatively, a non-dynamic PSA cycle may be employed wherein, for example, a bed is pressurised with the feed gas and then it is depressurised in two or more stages: in the initial depressurisation stage or stages, the less readily adsorbed component, or components, are released and in a subsequent depressurisation stage, or stages, the more readily adsorbed component, or components, are released.

As is well known in the art, various other steps can be included in the cycle, for example one or more pressure equalisation steps; sweeping, rinsing, and/or purging steps; and the desorption can be effected in stages to give one or more streams at an intermediate pressure and/or temperature and containing components of intermediate adsorbability, as well as a stream containing the more readily adsorbed components. Examples of various PSA cycles are described in, for example, EP-A-No. 183358.

The size of the adsorbent bed that has to be employed depends on the duration of the longest step in the cycle, e.g. the adsorption or the desorption/regeneration step: if this longest step can be made shorter, then it is possible to employ a smaller bed of adsorbent, and hence a smaller vessel to contain the bed. The required volume (V) of the adsorbent bed in turn depends on the effectiveness of the adsorbent which in turn depends, inter alia, on the ratio of the geometric surface area (GSA) of the adsorbent to the volume (Va) of adsorbent present in the bed. Va is of course the product of V and $(1 - BV)$ where BV is the bed voidage. Generally adsorbents have been employed in the form of pellets, e.g. small cylinders, or spheres. The GSA/Va ratio can of course be increased by making the pellets smaller but this has the disadvantage that, for a bed of given length to cross-sectional area ratio, the tendency of the bed to fluidisation, and also the pressure drop across the bed, is increased. This is often undesirable on economic grounds.

In the present invention the effectiveness of the adsorbent is increased by employing the adsorbent in the form of one or more units having a plurality of small passages therethrough so that the bed has a high GSA/Va ratio yet the adsorbent does not give rise to an unacceptable increase in the pressure drop.

Accordingly the present invention provides a heat and mass exchange, pressure and/or thermal swing adsorption process wherein the adsorbent bed consists of one or more units having substantially parallel passages extending therethrough, each unit having at least 20, preferably at least 25, passages per $cm^2$ of the cross-sectional area of said unit, the number and cross sectional area of said passages in each unit being such that each unit has a geometric voidage of not more than 0.45.

The passages preferably have a circular cross section, although other cross sections may be used. The effective diameter (dp) of a passage is herein defined as the diameter of the circle having the same perimeter as the passage cross section. Each passage has a notional diameter (dn) defined as the diameter of the circle of cross sectional area equal to that of the passage. [In the case of passages of circular cross section, the effective and notional passage diameters are the same and equal to the actual passage diameter.]

Preferably at least 50%, particularly at least 80%, of the passages in each unit have an effective diameter in the range 0.03 to 2.5 mm, particularly 0.1 to 1 mm, and most preferably 0.2 to 0.5 mm.

The aspect ratio of the adsorbent bed may be the same as, or greater than, that of adsorbent beds conventionally used, and is typically in the range 2 to 10, particularly above 3.

For the purposes of the present invention the geometric voidage GV of the units is defined as the ratio of the total cross sectional area of the passages in the unit, i.e. the number of passages times the number average passage cross sectional area, to the cross sectional area of the unit. Thus if there are N passages per $cm^2$ of the unit cross section and each passage has a notional diameter dn cm, the geometric voidage is $N \cdot \pi dn^2/4$.

In one form of the invention the adsorbent bed comprises a random packed bed of units as aforesaid. In this case the units preferably have a cylindrical configuration with the passages extending through the unit with their axes substantially parallel to the longitudinal axis of the cylinder. The units preferably have a diameter and length exceeding 3, but below 20, mm, and an aspect ratio, i.e. the ratio of their length to diameter, in the range 0.5 to 2, and particularly in the range 0.75 to 1.5. The length and diameter of such units are most preferably each in the range 6 to 15 mm.

Such units have a high GSA per volume of the unit, and although the voidage BV of a bed of the units will generally be somewhat greater than the voidage of a bed of particles having no through passages, the high GSA donated by the plurality of through passages increases the effectiveness of the units so that the ratio of the GSA of the bed to the volume Va of adsorbent in the bed is significantly higher than that of a bed of particles having no through passages. Since the GSA per volume of the unit is increased by the provision of the through passages, the size of the units may be increased, and yet the bed may have a similar, or greater GSA/Va, so that the pressure drop through the bed is decreased. Alternatively, since the through passages are effective to reduce the pressure drop, it is also possible to use smaller particles than in a conventional system.

When used in the adsorption process of the invention, it may thus also be possible to increase the velocity of the gas through the bed and/or to use smaller particles than is conventional, with the effect of further reducing the cycle time. If high gas velocities are employed, particularly in a PSA process where it is usual that, at different stages in the cycle, the gas flow direction is reversed, it may be desirable to employ a restrained bed to prevent fluidisation of the units. The particles may be so restrained by the provision of a mesh or perforated plate across the end of the bed of adsorbent units.

In another form of the invention the adsorbent bed is in the form of a single unit, or a close packed stack or assembly of units, with the passages through the, or each, unit being aligned in the direction of flow of gas through the bed.

In a bed formed from random packed cylindrical pellets having a length equal to their diameter, the bed voidage BV is the ratio of the volume of the spaces between the pellets to the volume of the bed and is about 0.35 to 0.4. Where the adsorbent bed is formed from a single structural unit, or from an assembly of units disposed side-by-side and/or end-to-end, the volume of any spaces between adjacent units may represent only a small fraction of the bed volume, generally less than 10% of the bed volume, and so the bed voidage BV is generally not much greater than the geometric voidage GV of the units as defined above. In the present invention the geometric voidage GV is not more than 0.45, and preferably is not more than 0.4. In particular it is in the range 0.15 to 0.4 and so the bed voidage BV may be of the same order as, or significantly smaller than, that of a random packed bed. The amount of adsorbent in a bed of given volume may thus be of the same order as, or significantly greater than, in a bed of random packed units.

Since, in this form of the invention where the bed comprises a single unit, or close packed assembly or stack of units, the external surface of the unit or units represents only a relatively small proportion of the surface area accessible to the gas undergoing treatment, for the purposes of the following discussion the external surface of the units will be ignored when considering the geometric surface area, GSA, of the bed. The GSA of the bed can thus be considered to be the product of the number of units in the bed, the number of passages in each unit, and the area of the wall of each passage; the area of the passage wall is the product of the perimeter of the passage cross section and the passage length. Again, where there are a plurality of units stacked end-to-end, there may be small spaces between at least parts of the ends of adjacent units for the reasons described hereinafter, but generally the product of the number of units along the length of the bed and the length of the passages in each unit will be only slightly less than the length of the bed. Consequently for the purposes of the present invention, where the adsorbent is a single unit, or stack or assembly of units, the ratio GSA/Va can be considered to equal to $$N.\pi.dp/(1-N.\pi.dn^2/4)$$

where N is the number of passages per $cm^2$ of the unit cross section area, dn is the notional passage diameter in cm and dp is the effective passage diameter in cm. Where the adsorbent bed is a random packed bed of small cylindrical units of length L cm and diameter D cm, the external surface area of the units may contribute significantly to the geometric surface area of the adsorbent bed. In this case the ratio GSA/Va can be considered to be $$2/L+(4/D+N.\pi d.p)/(1-N.dn^2.\pi/4)$$

The passages are preferably disposed in each unit in a regular pattern, particularly with a uniform spacing between adjacent passages. Preferably the passages are circular in cross section and are disposed in a hexagonal pattern, i.e. with the centre of each passage at the corner of an equilateral triangle. In such an arrangement the ratio, k, of the distance between the centres of adjacent passages to the diameter of the passages is preferably in the range 1.2 to 2.5, particularly in the range 1.4 to 2.0. In such an arrangement the number of passages per $cm^2$ of the unit cross sectional area is $$1/(k^2.d^2.\sin\pi/3),$$

i.e. about $1.15/(k^2.d^2)$, while the geometric voidage of the unit is $$\pi/(4.k^2.\sin\pi/3),$$

i.e. about $0.9/k^2$, where d is the passage diameter in cm.

The pressure drop through the bed decreases as the number of passages per $cm^2$ of the unit cross sectional area increases and as the hydraulic diameter dh of the passages increases. The hydraulic diameter dh is four times the cross sectional area of the passage divided by the perimeter of the passage cross section, i.e. $dn^2/dp$. We have found that it is possible by means of the present invention to employ an adsorbent bed having a GSA/Va that is significantly greater than that of a bed of random packed adsorbent particles having no through passages, but gives a similar pressure drop therethrough. As an example, when using a stack of adsorbent units in accordance with the present invention wherein the passages are of circular cross section arranged in a hexagonal configuration as aforesaid with the ratio k being 1.6, it is possible to reduce the volume of the adsorbent bed, compared to a conventional system using a bed wherein the adsorbent is in the form of spheres of diameter about 2 mm, by a factor of about 4 by the use of passages of diameter 0.5 mm, and by about 30 if the passages have a diameter of 0.2 mm.

Although in some cases it is possible to make a single unit that will occupy the whole cross sectional area of the bed, where a close packed assembly of smaller units stacked side-by-side and also, if necessary end-to-end, is to be employed, each unit should have an external configuration such that there are no significant spaces between the sides of adjacent units. This may be achieved by forming the units with the external configuration of prisms of polygonal, preferably regular, cross section, e.g. square, rectangular, triangular, or hexagonal. Units of other polygonal cross section, e.g. octagonal, can be used and may have units of differing cross section, e.g. square or triangular, and appropriate size also incorporated into the array to avoid spaces between the sides of adjacent units. Alternatively, the bed may be assembled from units, e.g. of circular cross section, packed side-by-side, with the spaces between the sides of adjacent units filled with a suitable filler material such as a cement. In an assembly of units, the units are oriented so that the passages are substantially parallel to the direction of flow of the gas being treated.

Where the adsorbent bed comprises units stacked end-to-end in layers, provision may be made, e.g. by providing the units with domed or roughened ends or by the use of perforate spacers, e.g. a mesh, to prevent access to the passages of one unit from being blocked by a unit of an adjacent layer and to provide for adequate mixing of the gas leaving one layer of units and before entering the next layer. It is preferred that any such space between adjacent units is less than 5 mm and is conveniently in the range 1 to 5 mm.

In some cases, where the bed is constructed from a series of units stacked or assembled end-to-end it may be desirable to provide a proportion of passages of larger effective diameter in order to reduce the pressure drop of gas flowing through the bed. However in such an assembly or stack the units are preferably assembled or stacked so that the larger diameter passages are not axially aligned from one unit to another through the length of the bed. Where such larger diameter passages are present, they typically have an effective diameter of up to about 10 times the effective diameter of the smaller passages.

Where the bed is made from an assembly of units, each unit preferably has a notional cross section diameter (i.e. the diameter of the circle of equal cross sectional area to the unit, ignoring the passages therethrough) of at least 5 mm, particularly at least 10 mm, and most preferably in the range 20 to 200 mm. The aspect ratio of each unit, i.e. the ratio of its length to its notional cross section diameter, will depend on the mode of manufacture of the unit, and is preferably above 1. As described below, the units are preferably made by extrusion and in such cases it may be possible to provide units having a length of up to 200 mm or more.

The units employed in the present invention may be made by extrusion of a suitable composition through a die having cores producing the desired passages. Alternatively the units may be made by pelleting or tabletting techniques. In this case the cores of the pelleting die may have a slight taper, for example of up to 3°, to assist in release of the units from the die. It will be appreciated that in such cases the passages will not have a completely uniform cross section. Pelleting or tabletting techniques are less suitable than an extrusion method when the units are to be made in large numbers and/or have a large number of passages in each unit.

Particularly suitable materials from which the units may be made include any of the materials employed as adsorbents in PSA or TSA processes, such as zeolites, silica gel, and activated carbon. Suitable zeolites include zeolites 4A, 5A, 13X, and mordenite. It will be appreciated that it is also possible to employ a precursor material which is subsequently converted to the active adsorbent material during or after the formation of the composition into the desired multiholed structure.

It will be appreciated that where the bed is made from an assembly of units stacked end-to-end, the units of each layer may differ from one another in, for example, the size and disposition of the passages therein, and/or in their chemical constitution. In such cases the assembly can be considered to constitute a number of separate adsorbent beds in series.

As indicated above the units are preferably made by an extrusion technique. To provide an extrudable consistency the composition usually contains a liquid and a viscosity-modifying polymer soluble or swellable in the liquid. If the liquid is water, which is preferred, the polymer can comprise for example a soluble carbohydrate such as starch, alginate, or xanthan gum; a cellulose ether; a protein; a polyvinyl alcohol, ester, acetal, ether, or mixed derivative, e.g. a partially hydrolysed polyvinyl acetate; a polyalkylene oxide; a polyacrylate or methacrylate; polyacrylamide or polymethacrylamide. Polymer mixtures may be employed. If the liquid is organic numerous organic polymers are suitable, for example polyolefins of high molecular weight (over 15,000) with a plasticiser such as a polyol, e.g. glycol or glycerol, or high boiling ester as the liquid. Particularly suitable polymer combinations for providing the extrudable consistency in water containing compositions are described in our EP-A-134138. As a further alternative, the extrudable consistency can be due to a water swellable inorganic compound oxide, for example a clay mineral such as bentonite or colloidal magnesium aluminium silicate sold under the trade name Vee Gum T, alone or in admixture with a viscosity modifying polymer.

After shaping, and, where the shaping process is by extrusion, preferably after cutting the extrudate to the desired length, the shaped product is dried, if necessary, and then, where a binder having an organic component is employed in the shaping step, the organic component may be burnt out, if desired, in a calcination step, preferably at 200° to 500° C., in an oxygen containing gas, e.g. air. Such a calcination step may also be advantageous even where no organic binder is employed. The shaped unit may then be sintered, if desired, to effect densification and to increase its strength, provided of course that such a step does not adversely affect the adsorption properties of the unit. Where the adsorbent material is a material such as active carbon, calcination in an oxygen containing environment should be avoided: if any binder is employed, it may remain in the adsorbent unit or the binder may be chosen so that it volatilises or carbonises during heating in an inert atmosphere, e.g. nitrogen.

Where the units are made by extrusion, it is important that, when the extrudate is cut into the desired lengths, the cutting process does not result in any significant distortion of the unit which would lead to the creation of undesirable spaces between units when they are assembled into the desired adsorbent bed and/or blockage of the passages. A cutting technique that is particularly suited to units of small cross section is described in EP-A-No. 223445. Another suitable cutting technique is described in our UK patent application No. 8610612 corresponding to European patent application No. 86308219.4.

As mentioned above one advantage of the use of the structured adsorbents of the present invention is that the adsorbent bed volume, and hence the cycle time can be reduced significantly. However in some cases this may lead to problems, particularly in a PSA process where the cycle time is generally much shorter than in a TSA process, associated with the need for rapid operation of the valves controlling the sequence. One method of overcoming this difficulty is to arrange the adsorbent as a bed in a rotating cylindrical vessel provided with suitably positioned ports. The bed preferably extends the length of the vessel: imperforate longitudinally extending partitions may be provided to separate parts of the bed from one another; as the pressure drop in directions perpendicular to the through passages is generally very high, in some cases such partitions may not be needed. As the vessel is rotated, a particular part of the bed therein is first in communication with the supply of the feed gas and the outlet port for the unadsorbed first product stream. Then that part of the bed is brought successively into communication with the appropriate port or ports for the other stages of the cycle while another part of the bed is in communication with the feed and first product stream outlet ports. In this type of arrangement it is possible to design the system so that the gas flow is either axial or radial. Instead of employing a rotating vessel, the vessel may be stationary and the ports, or connections between the ports and the bed, rotated relative to the vessel.

In such a rotary system it is preferred that the bed is formed from a single adsorbent unit, or stack or assembly of adsorbent units.

In such a rotary process for the separation of a feed gas containing components of different adsorbabilities into a first product stream containing the less readily adsorbed component or components and a second product stream containing the more readily adsorbed components or components, while continuously or intermittently effecting said relative rotation, said feed gas is fed to a first part of the adsorbent bed in communication with the port for the inlet of the feed gas and with the port for the outlet of said first product stream, and said first product stream is removed through said outlet therefor, whereby the more readily adsorbed component or components are adsorbed from said feed gas onto the adsorbent of said first part of the adsorbent bed; and, during at least part of the time that said feed gas is fed to said first part of the adsorbent bed, the second product stream is desorbed from a second part of the adsorbent bed, onto which said more readily adsorbed component or components had previously been adsorbed, through said outlet port for said second product stream; and thereafter the first part of the adsorbent bed is brought into communication with the outlet port for the second product stream and the more readily adsorbed component or components are desorbed from said first part of the adsorbent bed while said feed gas is fed to the second, or another, part of the adsorbent bed.

To illustrate the invention the following examples 1 and 2 show calculated process conditions for a PSA process and a TSA process in each case comparing the use of an adsorbent bed in accordance with the invention with a process employing a conventional particulate adsorbent having no through passages.

EXAMPLE 1

This example illustrates the use of PSA for air separation, producing a product stream containing 90% v/v oxygen at a rate of 33 te/day from an air feed at a pressure of 3 bar abs. with a pressure drop through the bed of 0.23 bar.

The above specification can be attained by a conventional process using an adsorbent in the form of spheres of diameter 2 mm random packed into three beds each of 6.4 m height and 2.44 m diameter. The total volume of adsorbent required in each bed is 30 $m^3$. Using this arrangement the adsorption time in each PSA cycle is 90 sec.

In accordance with the invention, the above specification could be achieved using three beds each of height 4.74 m and diameter 1.42 m wherein the adsorbent (chemically the same as in the conventional process above) is in the form of an assembly of units of hexagonal prismatic external configuration stacked side-by-side in layers with 2 mm spaces between adjacent layers to form the adsorbent bed, with each unit having a notional diameter of 15 mm and length of 25 mm and having passages of circular cross section of diameter 0.52 mm extending therethrough, the passages being disposed in a hexagonal array with the ratio k, as defined hereinbefore, of 1.56. The geometric voidage of each unit is about 0.37. In this case the total volume of adsorbent required in each bed is 7.5 $m^3$ and the adsorption time is only 22.5 sec.

Using a rotary system with horizontal flow through a horizontal single adsorbent bed, the above specification could also be achieved using a bed of diameter 2.8 m and length 1.54 m (adsorbent volume 3.3 $m^3$) wherein the adsorbent is in the form of an assembly of units as above but having passages of diameter 0.2 mm, again spaced so that k is 1.56. In this case the adsorption time of the PSA cycle would be only 3.3 sec.

EXAMPLE 2

This example illustrates the use of TSA for drying an ammonia synthesis gas comprising hydrogen and nitrogen in the molar ratio of about 3:1 and containing about 0.06% v/v water vapour, producing a product stream containing less than 1 ppm by volume of water vapour at a rate of 6000 kg mol/hour using ammonia synthesis purge gas at a temperature of 290° C. as the regeneration gas.

The above specification can be attained by a conventional process using an adsorbent in the form of spheres of diameter 1.6 mm random packed into beds giving a total adsorbent volume of 16.3 $m^3$. Using this arrangement the adsorption time in each TSA cycle is 8 hours, the time required for regeneration is 2.3 hours (hot regeneration gas for 1.6 hours and 0.7 hours cooling time), and the amount of regeneration gas required is 600 kg mol/hour.

In accordance with the invention, using a rotary system as described above, the above specification could be achieved using only 10.5 $m^3$ of adsorbent in the form of an assembly of units stacked side by side and end to end to form the adsorbent bed, with each unit having passages of circular cross section of diameter 1.12 mm extending therethrough, the passages being disposed in a hexagonal array with the ratio k, as defined hereinbefore, of 1.6. The geometric voidage of each unit is about 0.35. In this case the adsorption and regeneration times are the same as in the aforesaid process using the conventional adsorbent, but the regeneration gas flow rate required is only 120 kg mol/hour.

Using the same amount of regeneration gas, i.e. 120 kg mol/hour, if the adsorbent units are provided with 0.2 mm holes, but closer spaced so that k is still 1.6, the adsorbent volume required is only 0.33 $m^3$, the adsorption time being reduced to 0.26 hours, and the regeneration time reduced to 0.07 hours (hot regeneration gas for 0.05 hours and 0.02 hours cooling time).

In the above conventional TSA process, the heating of the regeneration gas is discontinuous and so while the average power requirement is 0.25 MW, a heater rated at 1.25 MW is required. In the above examples employing the extruded units of the invention for TSA, using a rotary adsorbent bed, not only can the heater be operated continuously, so that a heater rated at a lower duty can be employed, but also it is more economic to recover heat from the regeneration gas after passage through the part of the adsorbent bed undergoing the regeneration stage by heat exchange with the gas being fed to the heater. Also it is possible to use the hot gas from the part of the bed being cooled after regeneration as regeneration gas for another part of the bed. In this way the heater need supply only 0.09 MW representing a considerable power saving.

EXAMPLE 3

In this example the effect of the unit geometric voidage in a PSA air separation system is compared.

The adsorbent bed consists of an assembly of hexagonal prismatic units of zeolite 5A assembled side-by-side with each unit having a multiplicity of passages, arranged in a hexagonal array, extending therethrough with the passage axes substantially parallel to the longitudinal axis of the cylinder. Each unit has a geometric surface area per volume of the unit of about 47 $cm^{-1}$.

In the following table there are set out the calculated volumes of adsorbent bed required to produce 33 te/day of oxygen enriched air containing 90% v/v of oxygen from air fed at a pressure of 3 bar abs for units of differing passage diameters and hence geometric voidages. In the table there are also set out the calculated power requirements for compressing the air supplied to the adsorbent system.

| passage diameter (mm) | voidage of unit | N ($cm^{-2}$) | bed volume ($m^3$) | power* ($MW.h^{-1}.te^{-1}$) |
|---|---|---|---|---|
| 0.25 | 0.23 | 469 | 21 | 0.33 |
| 0.52 | 0.38 | 179 | 31 | 0.39 |
| 0.73 | 0.46 | 110 | 46 | 0.51 |
| 1.00 | 0.54 | 71 | 57 | 0.55 |

*MW per hour required for the compression of the air needed to produce one tonne of oxygen enriched air containing 90% v/v oxygen.

It is thus seen that not only does the use of multihole adsorbents units having a low voidage enable low adsorbent bed volumes to be employed but also the compression power required is significantly reduced as a result of the more efficient operation producing the required amount of product from a smaller quantity of air.

We claim:

1. A heat and mass exchange, pressure and/or thermal swing adsorption process for separating a gaseous mixture containing a more readily adsorbed component, or components, and a less readily adsorbed component, or components, into a first stream that is enriched, relative to said mixture, in respect of said less readily adsorbed component, or components, and a second stream that is enriched, relative to said mixture, in respect of said more readily adsorbed component, or components, wherein the adsorbent bed consists of one or more units formed from an adsorbent material effective to adsorb said more readily adsorbed component, or components, preferentially relative to said less readily adsorbed component, or components, each of said units having a plurality of substantially parallel passages extending therethrough, each unit having at least 20 passages per $cm^2$ of the cross-sectional area of said unit, the number and cross-sectional area of said passages in each unit being such that each unit has a geometric voidage of not more than 0.45.

2. A process according to claim 1 wherein at least 50% of the passages in each unit have an effective diameter in the range 0.03 to 2.5 mm.

3. A process according to claim 1 wherein the geometric voidage GV of each unit is in the range 0.15 to 0.4.

4. A process according to claim 1 wherein the passages are circular in cross section and are disposed in each unit in a hexagonal pattern with the centre of each passage at the corner of an equilateral triangle, the ratio of the distance between between the centres of adjacent passages in any unit to the diameter of the passages being in the range 1.2 to 2.5.

5. A process according to claim 1 wherein the adsorbent bed comprises a random packed bed of units of cylindrical configuration with the passages extending through the unit with their axes substantially parallel to the longitudinal axis of the cylinder, the diameter and length of each unit being in the range 3 to 20 mm and the ratio of the length to the diameter of each unit being in the range 0.5 to 2.

6. A process according to claim 1 wherein the adsorbent bed is in the form of a single unit, or a close packed stack or assembly of units, with the passages through the, or each, unit being aligned in the direction of flow of gas through the bed.

7. A process according to claim 6 wherein the adsorbent bed is a close packed assembly of units stacked side-by-side and, optionally, end-to-end, each unit having a polygonal prism external configuration whereby there are no significant spaces between the sides of adjacent units.

8. A process according to claim 6 wherein the adsorbent bed comprises units stacked end-to-end in layers, and spaces in the range 1 to 5 mm are provided between adjacent layers to prevent access to the passages of one unit from being blocked by a unit of an adjacent layer and to provide for mixing of the gas leaving one layer of units and before entering the next layer.

9. A process according to claim 6 wherein the adsorbent bed is made from an assembly of units, each unit having a notional cross section diameter in the range 20 to 200 mm, and a ratio of its length to its notional cross section diameter above 1.

10. A process according to claim 1 for the separation of a feed gas containing components of different adsorbabilities into a first product stream containing the less readily adsorbed component or components and a second product stream containing the more readily adsorbed components or components wherein the adsorbent is arranged as a bed in a cylindrical vessel, and ports are provided for the inlet of the feed gas to the vessel;
the outlet of the first product stream from the vessel; and
the outlet of the second product stream from the vessel; and provision is made for relative rotation between said ports and said bed, said process comprising, while continuously or intermittently effecting said relative rotation,
feeding said feed gas to a first part of the adsorbent bed in communication with the port for the inlet of the feed gas and with the port for the outlet of said first product stream, and removing said first product stream through said outlet therefor, whereby the more readily adsorbed component or components are adsorbed from said feed gas onto the adsorbent of said first part of the adsorbent bed; and, during at least part of the time that said feed gas is fed to said first part of the adsorbent bed, desorbing adsorbed second product stream from a second part of the adsorbent bed, onto which said more readily adsorbed component or components had previously been adsorbed, through said outlet port for said second product stream; and thereafter bringing the first part of the adsorbent bed into communication with the outlet port for the second product stream and desorbing the more readily adsorbed component or components from said first part of the adsorbent bed while feeding said feed gas to the second, or another, part of the adsorbent bed.

* * * * *